Patented Nov. 6, 1923.

1,473,192

UNITED STATES PATENT OFFICE.

ROYER LUCKENBACH, OF BROOKLYN, NEW YORK, ASSIGNOR TO LUCKENBACH PROCESSES, INC., OF SAN FRANCISCO, CALIFORNIA, A CORPORATION OF NEVADA.

ORE-CONCENTRATING PROCESS.

No Drawing.     Application filed March 6, 1920. Serial No. 363,864.

*To all whom it may concern:*

Be it known that I, ROYER LUCKENBACH, a citizen of the United States, and a resident of the borough of Brooklyn, county of Kings, city and State of New York, have invented a certain new and useful Ore-Concentrating Process, of which the following is a specification.

The invention relates to ore concentration by flotation in which ore in finely divided condition is mixed with water to form a free flowing pulp, to which is added a reagent, and which is then aerated or gasified whereby bubbles are formed in the pulp which on rising therein, will carry mineral particles of the ore to the surface of the pulp and form a froth thereon, while the earthy gangue will sink to the bottom.

The objects of the invention are the use of a gathering reagent in colloidal form and which will form an emulsion in the pulp without mechanical agitating or beating as is common with reagents at present in use; to use a reagent which may be manufactured in more or less condensed form, and which may be introduced into the pulp without previous treatment with the pulp, or the water of the pulp; which will have a high preferential affinity for the mineral content of the ore; and which will repel the earthy gangue content of the ore.

Further objects of the invention are to use a frothing compound which will mix with the water of the pulp without previous treatment with the said water; which will produce, in connection with the gathering reagent, a heavy, viscous, tenacious and dry froth which will be lasting and will not spontaneously break.

These and further objects will more fully appear in the following specification and claims.

The gathering reagent is preferably a colloidal mixture of a resin derivative, an acid, and a metallic sulphate in water, and in the preferred embodiment of the invention may be compounded by dissolving a small proportion of wood pitch in commercial sulphuric acid and adding thereto a small quantity of iron sulphate dissolved in water.

The frothing agent is preferably a colloidal mixture of an acidifier resin derivative and may be compounded by dissolving wood pitch in an alkaline solution and neutralizing the alkali by means of an acid.

A concrete example of the gathering reagent may be compounded as follows:

Dissolve 5 grams of wood pitch in 50 cc. of sulphuric acid. In order to dissolve the solution in the water, iron sulphate is added in the following manner: Dissolve 10 grams of iron sulphate in 100 cc. of water. Add 10 cc. of the iron sulphate solution to the pitch sulphuric acid solution with stirring. This is the gathering reagent, and may be employed in the flotation process in the proportion of 10 cc. of the gathering reagent in 1 gallon of the water of the pulp.

The frothing reagent may be compounded as follows:

Dissolve 5 grams of caustic soda in 1 quart of water, and in the alkaline water dissolve 50 grams of wood pitch. Dissolve 10 grams of commercial boric acid in 200 cc. of water, and add the boric acid solution to the alkaline pitch mixture until the alkali is neutralized.

The proportions above given are approximate only and may be widely varied as depends upon the ore to be worked.

The reagents above described may be introduced directly into the flotation machine without previous treatment with the pulp, or the water of the pulp, and will immediately emulsify in the pulp. The only agitation necessary is that required to aerate the pulp. If the pulp be aerated by nascent gas, or if the gas or air be introduced from below there need be no agitation, except that caused by the passage of the bubbles through the pulp, or that required to thoroughly mix the ore with the water.

In the preferred manner of carrying out the process of the invention the ore is mixed with water to form the pulp which is then introduced into the flotation machine without further treatment, and aeration by agitation or otherwise is proceeded with. The gathering and frothing reagents are then separately introduced into the pulp in quantities sufficient in the judgment of the operator to produce the desired result. The operator will know from the size of the bubbles, thickness of the froth, etc., when the proper amount of froth is being used, and by the mineralization of the froth when the proper amount of the gathering reagent is being introduced.

In a long run on an ore which does not vary in character the proper proportions of the gathering and frothing agent may be ascertained by experiment and a mixture of them made, and fed to the pulp.

On a sample of New Mexican chalcopyrite copper ore assaying 1.47% copper the following test was made:—

A pulp was made of 50 grams of the ore in water in which the above described reagent was present in the proportions of 10 cc. of reagent to 1 gallon of water.

A run of 10 minutes was made in a Case laboratory machine. A heavy, viscous, fine grain mineralized froth was raised to the surface and removed. The solid content of the froth weighed 15 grams, and assayed 5.30% copper. The tailings weighed 38 grams, and assayed .28% copper. This gave an extraction of 86.5% of the copper content of the ore.

The terms "dissolved" and "solution" as used herein are not intended to mean that the substances are in true solution. The pitch is not in true solution, but is reduced to what may be termed its ultimate fineness, with its suspended particles so changed by the so-called solvent that the particles of the pitch will seek out and attract, or attach themselves to the mineral particles, and will form the films of the bubbles.

The reagents will not be precipitated in the pulp but the molecules, as it were, will remain in suspension indefinitely, or if there is precipitation it will be so slow as not to effect the operation of the process.

In accordance with the provisions of the patent statutes the principle of the invention has been described, together with the apparatus which is now considered to represent the best embodiment thereof, but it is understood that the apparatus shown is merely illustrative, and that the invention may be carried out in other ways.

Having now described the invention, which is claimed and desired to be secured by Letters Patent, is:

1. The process of concentrating ore by froth flotation, which comprises mixing finely divided ore with water to form a pulp, introducing the reaction product of wood pitch and commercial sulphuric acid, and the acidified reaction product of pitch and caustic soda to the pulp, aerating the pulp to form a froth to which the mineral content of the ore will adhere, and separating the mineralized froth from the pulp.

2. The process of concentrating ore by froth flotation, which comprises mixing finely divided ore with water to form a pulp, introducing iron sulphate and the reaction product of wood pitch and commercial sulphuric acid, and the acidified reaction product of wood pitch and caustic soda to the pulp, aerating the pulp to form a froth to which the mineral content of the ore will adhere, and separating the mineralized froth from the pulp.

3. The process of concentrating ore by froth flotation, which comprises mixing finely divided ore with water to form a pulp, introducing a gathering reagent of wood pitch, commercial sulphuric acid and iron sulphate and a frothing reagent of acidified resin pitch dissolved in an alkali solution neutralized by means of an acid, aerating the pulp to form a froth to which the mineral contents of the ore will adhere and separating the mineral froth from the pulp.

This specification signed and witnessed this fourth day of March, 1920.

ROYER LUCKENBACH.

Witnesses:
J. F. COLEMAN,
A. E. RENTON.